US009558586B2

(12) United States Patent
Gautron et al.

(10) Patent No.: US 9,558,586 B2
(45) Date of Patent: Jan. 31, 2017

(54) METHOD FOR ESTIMATING THE OPACITY LEVEL IN A SCENE AND CORRESPONDING DEVICE

(71) Applicant: THOMSON LICENSING, Issy de Moulineaux (FR)

(72) Inventors: Pascal Gautron, Rennes (FR); Pascal Lecocq, Saint Gregoire (FR); Jean-Eudes Marvie, Betton (FR)

(73) Assignee: THOMSON LICENSING, Issy de Moulineaux (FR)

( * ) Notice: Subject to any disclaimer, the term of this patent is extended or adjusted under 35 U.S.C. 154(b) by 171 days.

(21) Appl. No.: 14/386,799

(22) PCT Filed: Mar. 28, 2013

(86) PCT No.: PCT/EP2013/056801
§ 371 (c)(1),
(2) Date: Sep. 20, 2014

(87) PCT Pub. No.: WO2013/144333
PCT Pub. Date: Oct. 3, 2013

(65) Prior Publication Data
US 2015/0042655 A1 Feb. 12, 2015

(30) Foreign Application Priority Data
Mar. 29, 2012 (FR) .................................... 12 52869

(51) Int. Cl.
*G06T 15/60* (2006.01)
*G06T 15/04* (2011.01)
*G06T 15/06* (2011.01)

(52) U.S. Cl.
CPC ............... *G06T 15/60* (2013.01); *G06T 15/04* (2013.01); *G06T 15/06* (2013.01); *G06T 2215/12* (2013.01)

(58) Field of Classification Search
None
See application file for complete search history.

(56) References Cited

U.S. PATENT DOCUMENTS 6,850,234 B2   2/2005   Zviaguina et al.
7,369,126 B1   5/2008   Hakura
(Continued)

OTHER PUBLICATIONS

Annen et al. (Annen, Thomas, et al. "Convolution shadow maps." Proceedings of the 18th Eurographics conference on Rendering Techniques. Eurographics Association, 2007).*

(Continued)

*Primary Examiner* — Mark Zimmerman
*Assistant Examiner* — Nurun N Flora
(74) *Attorney, Agent, or Firm* — Tutunjian & Bitetto, P.C.

(57) ABSTRACT

A method and device for estimating the opacity at a point of a scene lit by an area light source and comprising an object defined by a mesh and occluding some of the emitted light. In order to optimize the calculations for live estimation of the opacity, the method comprises sampling said area light source in a plurality of samples, for at least one sample of the plurality of samples and for at least one first mesh element of the occluding object visible from the at least one sample, generating one shadow plane per edge of the at least one first mesh element, estimating a opacity level depending on coefficients of projection in a function base from values representative of the opacity for a set of intersection points between at least one ray having for origin a viewpoint of the scene and shadow planes crossed by said at least one ray, depending on an angle formed by the normal associated with each shadow plane crossed and by said at least one ray.

13 Claims, 5 Drawing Sheets

(56) References Cited

U.S. PATENT DOCUMENTS

Figure 1:
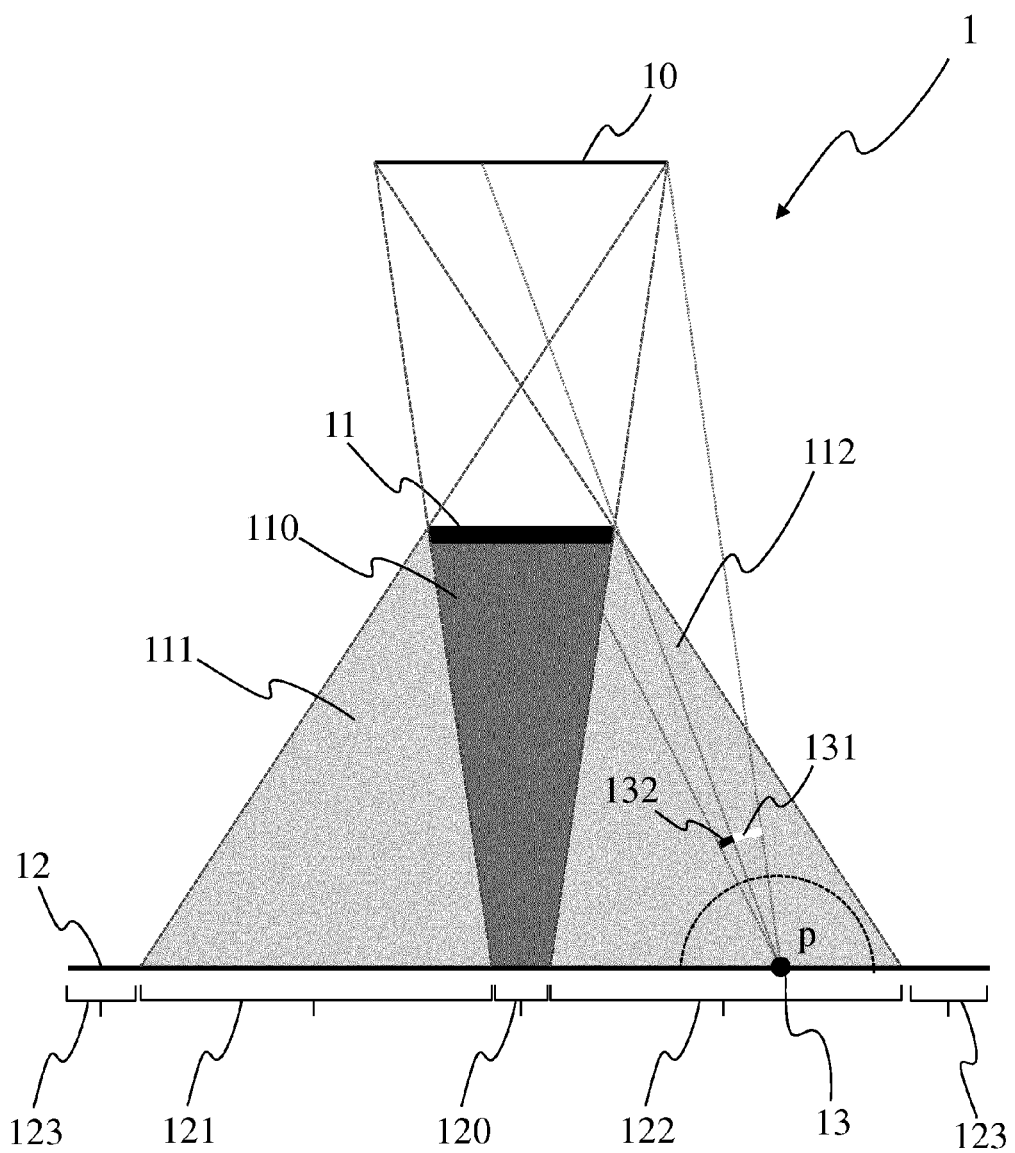

| | | | |
|---|---|---|---|
| 7,924,281 | B2 | 4/2011 | Morein et al. |
| 7,969,438 | B2 | 6/2011 | Feng |
| 7,982,734 | B2 | 7/2011 | Miller |
| 8,115,767 | B2 | 2/2012 | Stich |
| 2003/0112237 | A1 | 6/2003 | Corbetta |
| 2009/0034874 | A1* | 2/2009 | Miller .................... G06T 15/50 382/279 |
| 2010/0238172 | A1 | 9/2010 | Bavoil et al. |
| 2012/0039526 | A1 | 2/2012 | Garaas et al. |
| 2012/0256915 | A1* | 10/2012 | Jenkins .................. G06T 15/40 345/419 |

OTHER PUBLICATIONS

Hasenfratz etal: "A survey of real-time soft shadows algorithms", Computer Graphics Forum, Wiley-Blackwell Pubushing LTD, GB, vol. 22, N°4, Dec. 1, 2003 (Dec. 1, 2003), pp. 753-774.

Delalandre etal: "Transmittance function mapping", Symposium on Interactive 3D Graphics and Games on, I3D '11, Feb. 19, 2011, p. 31.

Jansen et al: "Fourier Opacity Mapping", Proceedings of the 2010 ACM SIGGRAPH Symposium; Feb. 19, 2010; pp. 165-172.

Annen etal: "Convolution shadow maps", Eurographics Symposium on Rendering (2007), Jun. 25, 2007; pp. 1-12.

Copy of Search Report Dated May 14, 2013.

Assarsson et al., "A Geometry-based Soft Shadow Volume Algorithm using Graphics Hardware", ACM SIGGRAPH 2003 Papers, SIGGRAPH '03, ACM, New York, 2003, pp. 511-520.

Fernando, "Percentage-closer soft shadows", ACM SIGGRAPH 2005 Sketches, SIGGRAPH'05, ACM New York, 2005, pp. 1-4.

Forest et al., "Realistic Soft Shadows by Penumbra-Wedges Blending", Graphics Hardware, Vienna, Austria, Sep. 3, 2006, pp. 39-48.

Guennebaud et al., "Real-time soft shadow mapping by backprojection", Eurographics Symposium on Rendering (EGSR), Nicosia, Cyprus, Jun. 26, 2006, pp. 227-234.

Haeberli et al., "The Accumulation Buffer: Hardware Support for High-Quality Rendering", Computer Graphics, vol. 24, No. 4, Aug. 1990, pp. 309-318.

Johnson et al., "Soft Irregular Shadow Mapping:Fast, High-Quality, and Robust Soft Shadows", Proceedings of the 2009 Symposium on Interactive 3D graphics and games, I3D '09, Boston, Massachusetts, Feb. 27, 2009, pp. 57-66.

Sintorn et al., "Sample Based Visibility for Soft Shadows using Alias-free Shadow Maps", Eurographics 2008, vol. 27, No. 4,2008, pp. 1-8.

Yang et al., "Variance Soft Shadow Mapping",.Computer Graphics Forum, vol. 29, No. 7, 2010, pp. 2127-2134.

Eisemann et al., "Real-time shadows", CRC Press, Boca Ratan, Jul. 27, 2011, Chapter 1, pp. 1-20.

Jansen et al., "Fourier opacity mapping", Proceedings of the 2010 ACM SIGGRAPH Symposium on Interactive 3D Graphics and Games, Washington, D.C., USA, Feb. 19, 2010, pp. 165-172.

* cited by examiner

METHOD FOR ESTIMATING THE OPACITY LEVEL IN A SCENE AND CORRESPONDING DEVICE

This application claims the benefit, under 35 U.S.C. §365 of International Application PCT/EP2013/056801, filed Mar. 28, 2013, which was published in accordance with PCT Article 21(2) on Oct. 3, 2013 in English and which claims the benefit of French patent application No. 1252869 filed Mar. 29, 2012

1. DOMAIN OF THE INVENTION

The invention relates to the domain of synthesis image composition and more specifically to the domain of the estimation of the shadowing at a point of a virtual scene or the estimation of the quantity of light received by a point of a virtual scene. The invention is also understood in the context of special effects for a live composition.

2. PRIOR ART

According to the prior art, there are several techniques for generating soft shadows due to the light occlusion originating from an area light source. One of these techniques is known as stochastic approach according to which the area light source is sampled in a large number of point light sources. A hard shadowing is calculated for each point light source using shadow mapping or shadow volume techniques combined with the use of z-buffers to render the scene from the light source. To obtain a realistic shadow rendering and eliminate the quantization defects linked to the light source sampling, it is necessary to use a very large number of samples, which will lead to a large number of calculations penalizing the live rendering of the scene. Another soft shadow rendering technique is known as PCSS (Percentage-Closer Soft Shadows) which is based on a relationship with the PCF (Percentage Close Filtering) kernel size used for filtering the shadow map, an estimation of the penumbra zone width based on the average distance of the light source occluding objects and on the distance between the point receiving the light and the light source. One of the disadvantages of this technique is that it is limited to the flat surfaces and that it is costly in calculation when the PCF becomes large, making the live rendering of the scene difficult.

3. SUMMARY OF THE INVENTION

The purpose of the invention is to overcome at least one of these disadvantages of the prior art.

More specifically, the purpose of the invention is notably to optimize the necessary calculations for the realistic and live estimation of the opacity (opacity) level associated with one or more points of a virtual scene.

The invention relates to the method for estimating the opacity at a point of a scene, the scene being lit by an area light source, the scene comprising at least one object occluding some of the light emitted by the light source, the occluded object being defined by a mesh. In order to estimate the opacity level associated with a point of the scene, the method comprises the following steps:
sampling of the area light source in a plurality of samples,
for at least one sample of the plurality of samples and for at least one first mesh element of the occluding object visible from the at least one sample, generation of one shadow plane per edge of the at least one first mesh element,
estimation of coefficients of projection in a function base from values representative of the opacity for a set of intersection points between at least one ray having for origin a viewpoint of the scene and crossing the scene and shadow planes crossed by the at least one ray, depending on an angle formed by the normal associated with each shadow plane crossed and by the at least one ray,
estimation of a value representative of a opacity level at a point from the at least one ray from the estimated coefficients of projection.

According to an advantageous characteristic, the coefficients of projection are estimated from a weighted sum of opacity levels associated with the shadow planes crossed by the at least one ray.

According to a particular characteristic, the opacity level increases along the at least one ray when the angle formed by the at least one ray and the normal associated with a shadow plane crossed by said at least one ray is greater than 90° and when the opacity level decreases along the at least one ray when the angle formed by the at least one ray and the normal associated with a shadow plane crossed by the at least one ray is less than 90°.

According to a specific characteristic, the opacity level increases or decreases by a value corresponding to a report equal to the total quantity of light emitted by the area light source on the number of samples when the at least one ray has an intersection with a shadow plane.

Advantageously, the generation of shadow planes comprises a subdivision step of the at least one first mesh element into a plurality of second elements, the shadow planes being generated by geometric deformation of the second elements.

According to a particular characteristic, the function base is a Fourier function base.

Advantageously, the projection coefficients are stored in at least one projective texture map.

The invention also relates to a device configured for the estimation of the opacity at a point of a scene, said scene being lit by an area light source, said scene comprising at least one object occluding some of the light emitted by said source, said object being defined by a mesh, the device comprising at least a processor configured for:
sampling the area light source in a plurality of samples,
generating, for at least one sample of the plurality of samples and for at least one first mesh element of the occluding object visible from the at least one sample, a shadow plane per edge of the at least one first mesh element.
estimating the coefficients of projection in a function base from values representative of the opacity for a set of intersection points between at least one ray having for origin a viewpoint of the scene and crossing the scene and the shadow planes crossed by the at least one ray, depending on an angle formed by the normal associated with each crossed shadow plane and by the at least one ray,
estimating a value representative of a opacity level at a point of the at least one ray from the estimated coefficients of projection.

Advantageously, the opacity level increases along the at least one ray when the angle formed by the at least one ray and the normal associated with a shadow plane crossed by the at least one ray is greater than 90° and in that the opacity level decreases along the at least one ray when the angle formed by the at least one ray and the normal associated with a shadow plane crossed by the at least one ray is less than 90°.

According to a particular characteristic, the opacity level increases or decreases by a value corresponding to a ratio equal to the total quantity of light emitted by the area light source over the number of samples when the at least one ray has an intersection with a shadow plane.

According to another characteristic, the at least a processor is further configured for subdividing the at least one first mesh element into a plurality of second elements, the shadow planes being generated by geometric deformation of the second elements.

The invention also relates to a computer program product comprising program code instructions for the execution of the steps of the method for estimating the opacity at a point of a scene when the program is executed on a computer.

In addition the invention relates to a computer readable storage mean, storing the instructions set that can be executed by the computer to implement the method for estimating the opacity at a point of a scene.

4. LIST OF FIGURES

Figure 2:
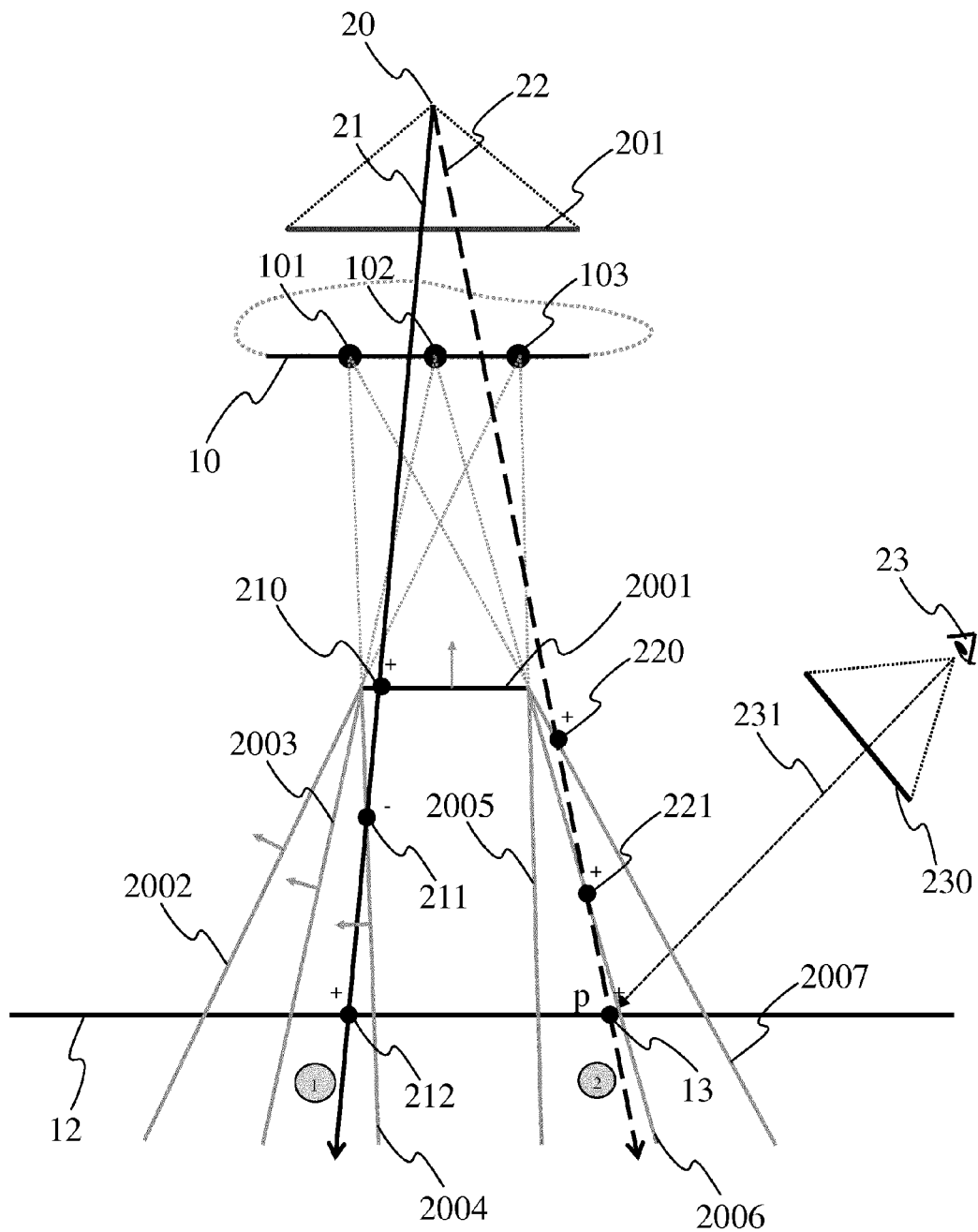
Figure 3:
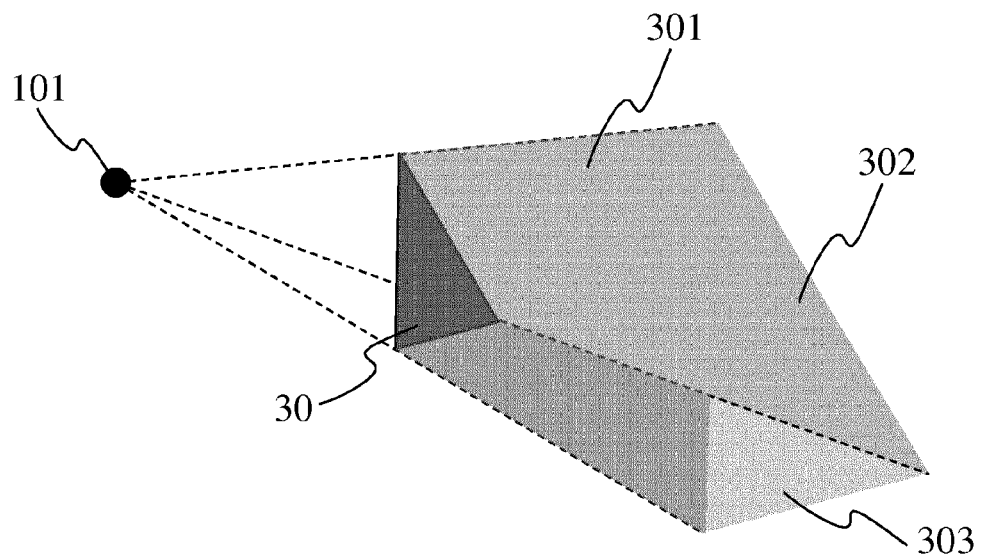
Figure 4:
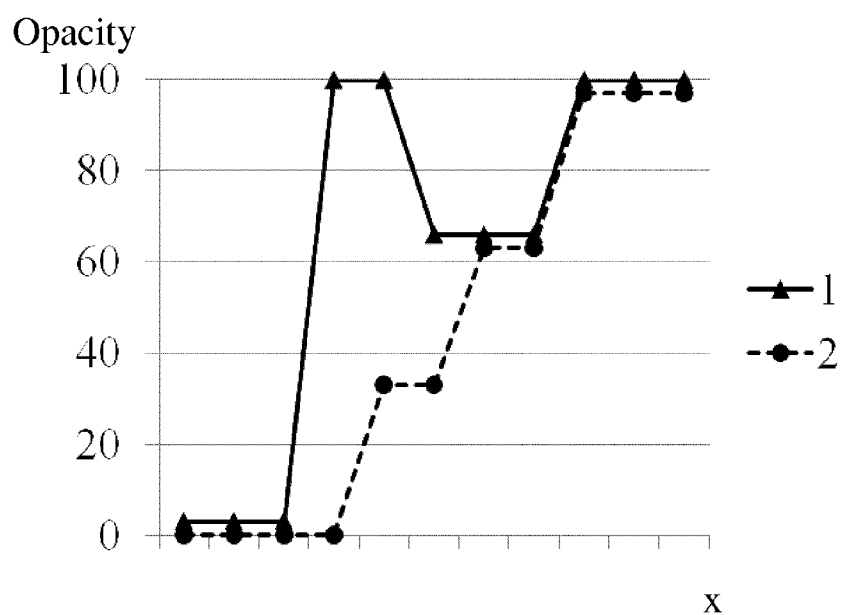
Figure 5:
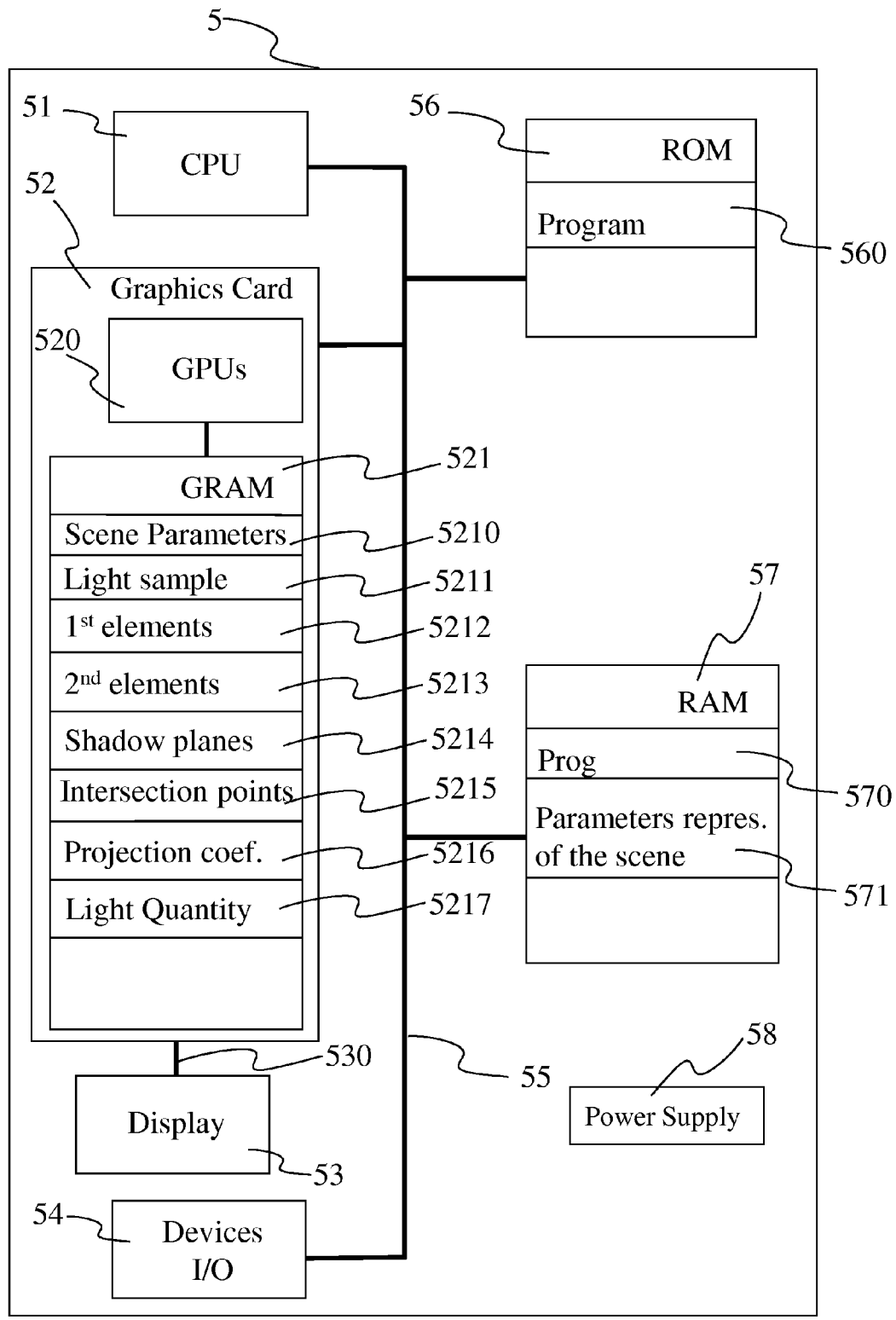
Figure 6:
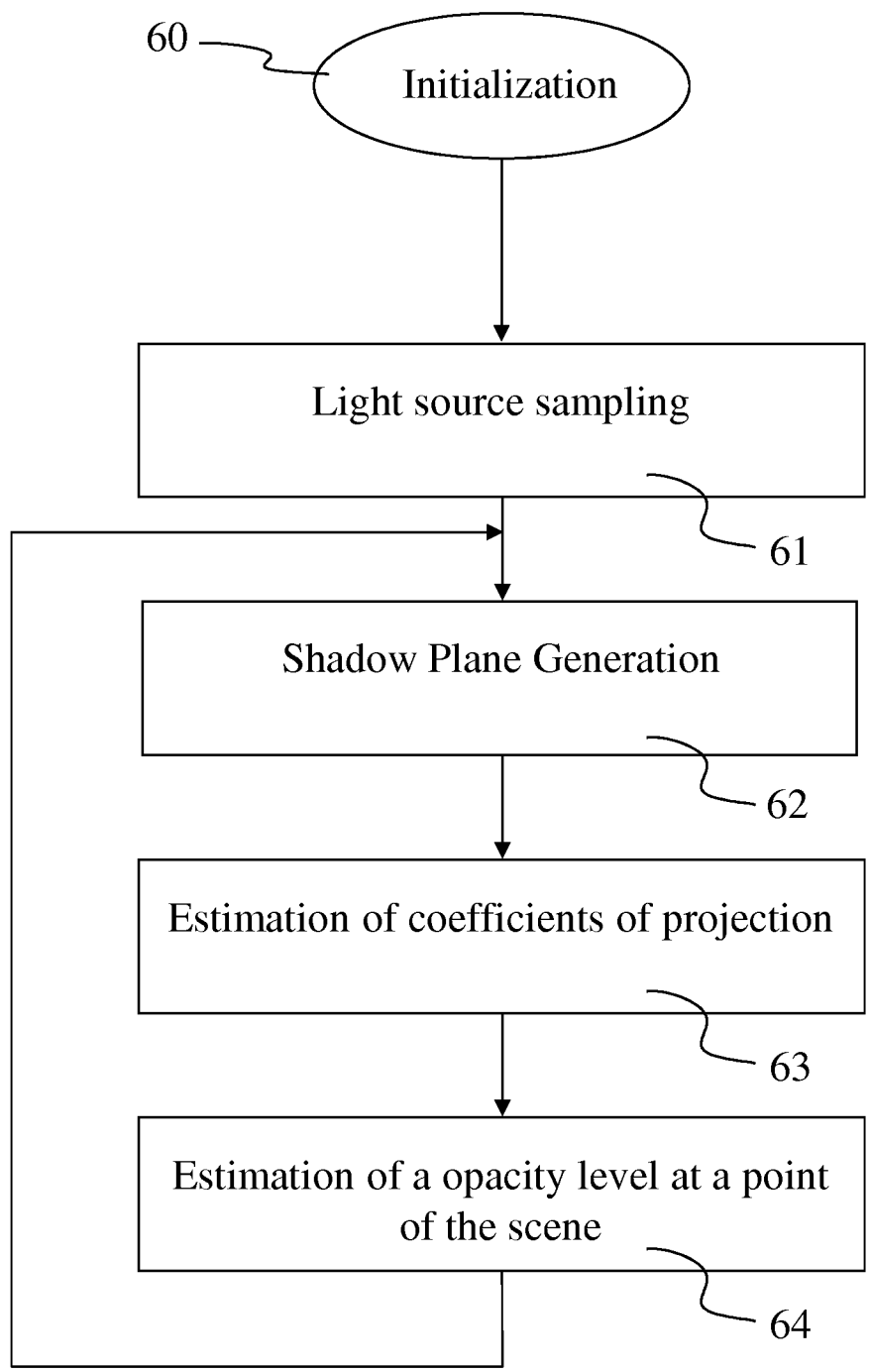

The invention will be better understood, and other specific features and advantages will emerge upon reading the following description, the description making reference to the annexed drawings wherein:

FIG. 1 shows a scene 1 lit by an area light source and comprising an occluding object generating soft shadows, according to a particular embodiment of the invention, FIG. 2 shows a method for estimating the opacity function along the rays crossing the scene of FIG. 1 according to a particular embodiment of the invention, FIG. 3 shows the generation of shadow planes originating from a lighting element of the occluding object of FIG. 1, according to a particular embodiment of the invention, FIG. 4 shows two opacity functions obtained according to the method of FIG. 2, according to a particular embodiment of the invention, FIG. 5 shows a device implementing a method for estimating the quantity of light received at a point of the scene in FIG. 1, according to a particular embodiment of the invention, FIG. 6 shows a method for estimating the quantity of light received at a point of the scene in FIG. 1, according to a particular embodiment of the invention,

5. DETAILED DESCRIPTION OF EMBODIMENTS OF THE INVENTION

FIG. 1 shows, according to a particular and non-restrictive embodiment of the invention, a virtual scene 1 lit by an area light source 10, that is to say the light is lit by several points forming a surface or a volume, as opposed to one point light source. The scene 1 comprises an opaque object 11 also called occluding object which masks at least some of the light emitted by the area light source 10. Thus, a zone 120 of the surface 12 of a scene 1 object is situated in the cast shadow 110 of the occluding object 11, that is to say that this zone 120 does not receive light from the area light source 10. Two other zones 121 and 122, called penumbra zones, of the surface 12 are situated in partially lit parts 111 and 112, that is that these zones 121 and 122 only receive some of the light emitted by the area light source 10. The quantity of light received by these penumbra zones 121 and 122 is not uniform, the more distant points of the shadow zone 120, receive more light than the closest points of the shadow zone 120. A penumbra gradient thus appears in these penumbra zones 121 and 122, the opacity level being all the stronger as one is situated in proximity to the shadow zone 120 or, in other words, the quantity of light received being lower and lower as the distance separating a point of the penumbra zones 121 and 122 decreases. These penumbra zones 121 and 122 correspond to soft shadow zones, that is to say zones for which the passage from shadow to light is gradual. The dark level or the lighting level associated with a point P 13 situated in a penumbra zone 122 depends for example on the ratio formed by a visible solid angle 131 on an occluded solid angle 132. The visible solid angle 131 corresponds to the part of the area light source 10 participating in the lighting of the point P 13, that is to say the part of the area light source to which the emitted light is not occluded by the occluding object 11 and reaches point P 13. The occluded solid angle 132 corresponds to the part of the area light source 10, not participating in the lighting of the point P 13, that is to say the part of the area light source to which the emitted light is occluded by the occluding object 11 and does not reach point P 13. According to a variant, the lighting level associated with Point P 13 depends on the visible solid angle 131. According to another variant, the dark (or occlusion) level associated with Point P 13 depends only on the occluded solid angle 132. For a point of the shadow zone 120, the visible solid angle is null and the lighting level is null, that is the quantity of light received by such a point directly from the area light source 10 is null. The dark (or occlusion) level is consequently maximum, for example equal to 100% of dark or occlusion. The zones 123 of the surface 12 correspond to the lit zones of surface 12, that is to say zones comprising points receiving light from the entire area light source 11, that is that for these points, the light emitted by the area light source 11 is not at all occluded by the occluding object 11.

FIG. 2 shows a method for estimating the lighting or the occlusion level at a scene 1 point, for example at a point situated in a penumbra zone, according to a particular non-restrictive embodiment of the invention. The area light source 10 is sampled in a plurality of samples 101, 102, 103 (for example 8, 16, 32 or 64 samples) assimilated to points or to point light sources. The occluding object 11 is represented by its upper surface 2001, that is to say by the part facing the light source and totally or partially blocking the emitted light by the area light source 10. The occluding object is advantageously modelled by a mesh comprising a plurality of first elements forming the mesh, for example polygons, for example triangles or parallelepipeds. The occluding object is modelled according to any method known to those skilled in the art, for example by polygonal modeling, in which the model is assimilated with a set of polygons, each defined by the list of summits and edges that compose it, by NURBS (Non Uniform Rational Basic Spline) type in which the model is defined by a set of curves created via control points or "control vertices", by subdivision of surface modelling . . . . For each sample 101, 102, 103 of the area light source, shadow planes are generated for each edge of each first mesh element of the occluding object. One part of these shadow planes is represented in a cross sectional view on FIG. 2 and corresponds to planes 2001, 2002, 2003, 200, 2005, 2006 and 2007

FIG. 3 shows shadow planes 301, 302, 303 generated from a sample 101 among the plurality of the area light source samples by respectively the three edges of a first mesh element 30 of the occluding object corresponding to a triangle. Each shadow plane is defined by one of the triangle edges 30 and by two straight line segments having for origin the considered sample 101 of the light source and passing by the two summits of the triangle 30 belonging to the considered edge. Each shadow plane corresponds to an edge silhouette and takes the form of a parallelepiped, defined by two triangles for example. To define the shadow planes associated with a triangle 30 lit by a sample of the light source, 6 triangles prove to be necessary (2 triangles for each of the 3 shadow planes 301, 302 and 303). The triangle 30 itself also forming a shadow plane by definition, 7 triangles are therefore required to define the shadow planes associated with a first mesh element lit by the sample 101 of the light source. If the set of the N samples of the light source lighting this first mesh element is considered, a triangle in this case, 7×N triangles will be necessary to define the shadow planes associated with this first mesh element.

According to an advantageous variant of the invention, the first mesh element is subdivided or sampled in a plurality of second mesh elements (for example 7 second elements), for example in a plurality of triangles. This subdivision of first mesh elements is advantageously implemented by the tessellation unit or tessellation shader stage of the graphics card rendering pipeline to generate these second mesh elements on-the-fly and live. Each of these two mesh elements is thus geometrically distorted by the use of suitable geometric functions, to form shadow planes associated with the first mesh element. If the first mesh element corresponds to a first triangle and is subdivided to 7 second triangles, one of the second triangles is geometrically distorted to form the first triangle. Thus 6 second triangles remain for forming by geometric deformation the three shadow planes 301, 302, 303 associated with the first triangle (2 second triangles per shadow plane). The geometric deformation process is advantageously carried out by the geometry shader stage/unit of the rendering pipeline of the graphics card. This variant has the advantage of benefiting from the parallel and live data processing capacities of the rendering pipeline of the graphics card (particularly the tessellation and geometry shader stage/units), which can reduce the memory requirements to store the parameters representative of the shadow planes generated by silhouette extension (as explained in the previous paragraph), such paragraphs being generally calculated by a microprocessor of the CPU "Central Processing Unit" type owing to the large number of data to process, the parameters resulting from the calculations performed by the CPU being stored in RAM and requiring a significant memory space. According to this advantageous variant, all calculations are performed by a GPU "Graphical Processing Unit" which offers the advantage of generating live shadow planes and limiting memory requirements.

As the shadow planes 2001 to 2007 (associated with the edges of the first mesh elements and generated from each of the samples 101 to 103 from the area light source) shown in FIG. 2 are generated, intersections between these shadow planes 2001 to 2007 on one hand and one or more rays 21, 22 originally having a viewpoint 20 determined from the scene 1 and crossing the scene 1 on the other hand are determined. A first ray 21 has a first intersection 210 with the shadow plane 2001, (corresponding to the shadow plane defined by the of the first mesh elements of the occluding object facing the area light source), a second intersection 211 with the shadow plane 2004 and a third intersection 12 with the surface 12 (assimilated to the shadow plane defined by the surface of the mesh elements of the surface 2 which corresponds to a second occluding object as it is occluding the light emitted by the light source 10). The viewpoint 20 is advantageously determined automatically in such a manner as to cover the light source 11 and the penumbra and shadow zones. According to a variant, the viewpoint 20 is a user adjustable parameter.

From the intersections between the rays 21, 22 and the shadow planes 12, 2001 to 2007 and from values representative of opacity associated with each shadow plane 12, 2001 to 2007, a opacity function is determined along each ray. The opacity function is the function representative of opacity variations along a ray. The opacity function O(x) is advantageously expressed in a function base, for example a Fourier function base. Considering the opacity level varies according to an interval [O, $D_{max}$] along ray 21 or 22, the opacity function may be expressed in a Fourier cosine function base in the following manner.

$$O(x) = \frac{a_o}{2} + \sum_{k=1}^{\infty} a_k \cos\left(\frac{\pi x}{D_{max}}\right) \qquad \text{Equation 1}$$

with $$a_k = \frac{2}{D_{max}} \int_0^{D_{max}} O(x)\cos\left(\frac{k\pi x}{D_{max}}\right)dx \qquad \text{Equation 2}$$

Which gives $$\int_0^d O(x)dx = \frac{a_o}{2}d + \frac{D_{max}}{\pi} \sum_{k=1}^{\infty} \frac{a_k}{k} \sin\left(\frac{k\pi x}{D_{max}}\right) \qquad \text{Equation 3}$$

$a_o$ being a coefficient of projection of index 0,
$a_k$ being a coefficient of projection of index k, k corresponding to the coefficient of projection number,
x corresponding to the distance along a ray between the origin and a given point of the ray,
d corresponding to the distance from the origin along the ray at which the opacity level is evaluated.

The coefficients of projection k are advantageously estimated using the Dirac distribution properties (also named "Dirac delta function") in equation 2 as being a weighted sum of the opacity samples randomly generated by the shadow planes. A opacity sample corresponds to the intersection between the ray and a shadow plane crossed by the ray, the opacity sample being randomly generated as the shadow planes are generated as and when without any particular order. Each time a shadow plane is generated at the rendering pipeline level of the graphics card, its possible intersection with a ray is determined and used to estimate the coefficients of projection representative of the opacity function associated with the considered ray. Considering the impact produced by a single shadow plane with which a given opacity value is associated $\alpha_0$ at a distance $d_0$ from the origin point 20 along the ray, the following are obtained:

$$V(d) = 1 - \begin{cases} 0 & si\ d < d_0 \\ \alpha_0 & si\ d > d_0 \end{cases} \qquad \text{Equation 4}$$

V(d) corresponding to the visibility function along the ray and being a function of the opacity function:

$$V(d) = 1 - \int_0^d O(x)dx \qquad \text{Equation 5}$$

By using the Dirac distribution, the following is obtained:

$$V(d) = 1 - \int_0^d \alpha_0 \times \delta(d-d_0)dx \qquad \text{Equation 6}$$

Generalizing for M samples, corresponding to M intersections between the ray and the shadow plane, the following are obtained:

$$V(d) = 1 - \int_0^d (\Sigma_{i=0}^M \alpha_i \times \delta(x - x_i)) dx \qquad \text{Equation 7}$$

$$O(x) \approx \Sigma_{i=0}^M \alpha_i \times \delta(x - d_i) \qquad \text{Equation 8}$$

Substituting O(x) in the equation 2 and using the fact that $$\int_{-\infty}^{+\infty} f(x) \delta(x-c) dx = f(c)$$

The following is obtained:

$$a_k \approx \frac{2}{D_{max}} \sum_{i=0}^M \alpha_i \cos\left(\frac{k\pi d_i}{D_{max}}\right) \qquad \text{Equation 10}$$

Thus, as this clearly appears with respect to equation 10, the coefficients of projection $a_k$ are estimated from a weighted sum of the opacity levels associated with the shadow planes crossed by the considered ray, the weighting coefficients used being directly linked to $\alpha_i$.

The coefficients of projection representative of the opacity function along a ray are advantageously stored in a projective texture map 201 of RGBα type associated with the viewpoint 20, that is that it is possible to store 4 coefficients for a ray in such a projective texture map. According to a variant, many projective texture maps of RGBα type are associated with the viewpoint 20 and used to store more than 4 coefficients of projection per ray, for example 2, 3 or 4 projective texture maps to respectively store 8, 12 or 16 coefficients of projection per ray. Advantageously, the number of rays 21, 22 for which coefficients of projection representative of the opacity function (or visibility in an equivalent manner) are estimated corresponds to the number of pixels of a part of the projective texture map covering the scene comprising the zone of the shadow planes, each ray crossing a pixel of this part of the projective texture map.

The opacity value a associated with each shadow plane is advantageously equal to the ratio ±1/N, N corresponding to the number of samples 101, 102, 103, of the sampled light source 10. The (positive or negative) sign associated with the opacity value a associated with the intersection between a considered shadow plane and the ray depends on the angle formed by the normal to the considered shadow plane and considered ray. Thus, if the angle formed by the ray and the normal to the considered shadow plane is greater than 90° (π/2) then α=+1/N, that is to say that the opacity level along the ray increases when the ray crosses this shadow plane. If the angle formed by the ray and the normal to the considered shadow plane is less than 90° (π/2) then α=−1/N, that is to say that the opacity level along the ray decreases when the ray crosses this shadow plane. According to a variant, the opacity value a associated with each shadow plane is equal to plus (+) or minus (−) a predetermined constant and stored as a parameter or to a (positive or negative depending on the angle) constant selected by a user of the system.

As a shadow plane is generated, the intersections between this shadow plane and each of the rays crossing the pixels of the projective texture map are determined. Depending on the angle formed by the rays and the shadow plane, the sign of the opacity value is determined, the distance between the origin of the rays and each of the intersections is determined. The values of the coefficients of projection for each ray are updated in the projective texture map or maps.

The estimated coefficients of projection for each ray 21, 22 crossing a pixel of the projective texture map can define a opacity function associated with the ray, for which an illustration is given in FIG. 4. FIG. 4 shows the opacity variations depending on the distance x traveled between the origin of each one of the rays 21, 22 and a considered point of the rays. The solid line curve noted 1 shows the opacity level variations along the ray 1 referenced 21 on FIG. 2 and the dotted line curve 2 shows the opacity level variations along ray 2 referenced 22 in FIG. 2. Note that a opacity level equal to 0 corresponds to a point belonging to a lit zone of the scene, that a opacity level equal to 100 corresponds to a point of a ray belonging to a of the scene (that is to say a zone not receiving light from the light source) and that a opacity level comprised between 0 and 100 (0 and 100 being excluded) corresponds to a point of a ray comprised in a penumbra zone (that is to say a point receiving some of the total light quantity emitted by the light source).

According to a variant, the opacity level associated with a ray point corresponds to the sum of the opacity values associated with each shadow plane crossed by the ray to reach the considered point.

For each point of a ray, the quantity of light received at this point is determined from a opacity level at this point (advantageously determined from the coefficients of projection associated with this ray). This quantity of light received by the point P can define the attributes (luminance level for example) associated with a pixel point (which is associated with this point P) of an image plane 230 according to a viewpoint 23 of the scene.

FIG. 5 diagrammatically shows a material embodiment of device 5 adapted to the estimation of the opacity functions representative coefficients of projection along the rays crossing scene 1, to the estimation of the quantity of light received at a point of the scene depending on the opacity level associated with this point and to the creation of display signals of one or more images. The device 5 corresponding for example to a personal computer PC, a laptop or a games console.

The device 5 comprises the following elements, connected to each other by a bus 55 of addresses and data that also transports a clock signal:
  a microprocessor 51 (or CPU),
  a graphics card 52 comprising:
    several Graphics Processing Units 520 (or GPUs),
    a Graphical Random Access Memory (GRAM) 521,
  a non-volatile memory of the ROM ("Read Only Memory") type 56,
  a random access memory or RAM 57,
  one or more I/O ("Input/Output") devices 54 such as for example a keyboard, a mouse, a webcam, and
  a power supply 58.

The device 5 also comprises a display device 53 of the display screen type directly connected to the graphics card 52 to display in particular the rendering of computer-generated graphics calculated and composed in the graphics card, for example in live. The use of a dedicated bus to connect the display device 53 to the graphics card 52 offers the advantage of having much greater data transmission bitrates and thus reducing the latency time for the displaying of images composed by the graphics card. According to a variant, a display device is external to the device 5 and is connected to the device 5 by a cable transmitting the display signals. The device 5, for example the graphics card 52, comprises a transmission media or connector (not represented on FIG. 5) suited to transmit a display signal to an external display means such as for example an LCD or plasma screen, a video projector.

It is noted that the word "register" used in the description of memories 52, 56 and 57 designates in each of the mentioned memories a memory zone of low capacity (some binary data) as well as a memory zone of large capacity (enabling a whole program to be stored or all or part of the data representative of data calculated or to be displayed).

When powered up, the microprocessor 51 loads and runs the instructions of the program contained in the RAM 57.

The random access memory 57 notably comprises:
- in a register 570, the operating program of the microprocessor 51 responsible for switching on the device 5,
- parameters 571 representative of scene 1 (for example the summits and edges of the first mesh elements of the occluding object or objects 11 and 12, the lighting parameters associated with the area light source 10).

The algorithms implementing the steps of the method specific to the invention and described hereafter are stored in the memory GRAM 57 of the graphics card 52 associated with the device 5 implementing these steps. When powered up and once the parameters 570 representative of the media are loaded into RAM 57, the graphics processing units 520 of the graphics card 52 load these parameters into GRAM 521 and execute the instructions of these algorithms in the form of microprograms of the "shader" type using the HLSL ("High Level Shader Language") language, the GLSL ("OpenGL Shading language") language for example.

The GRAM random access memory 521 comprises in particular:
- in a register 5210, the parameters representative of the scene 1,
- the parameters 5211 representative of the area light source sampling (for example the number of samples, an index associated with the samples),
- parameters 5212 representative of the first mesh elements of the occluding object or objects of the scene (for example summits and edges associated with the first elements, an index associated with each first element),
- parameters 5213 representative of the second subdivision elements of the first mesh elements (for example summits and edges associated with the second elements, an index associated with each second element),
- parameters 5214 representative of the shadow planes (for example second elements having enabled the generation of the shadow plane, the opacity value associated with a shadow plane),
- parameters 5215 representative of the intersections between a ray and the shadow planes crossed by this ray (for example the distance between the origin of the ray and the considered intersection point, the positive or negative sign of the opacity value associated with the shadow plane crossed,
- coefficients of projection 5216 representative of opacity functions along the rays, and
- values 5217 representative of the quantity of light received at points of the scene belonging to one of the rays 21, 22.

According to a variant, a part of the RAM 57 is assigned by the CPU 51 for storage of the parameters 5211, 5212 and the values 5213, 5214 and 5215 if the memory storage space available in GRAM 521 is insufficient. This variant however brings about longer latency times in the composition of an image comprising a representation of the scene 1 composed from the microprograms contained in the GPU since the data must be transmitted from the graphics card to the random access memory 57 by means of the bus 55 whose transmission capacities are generally lower than those available in the graphics card to transfer the data from the GPU to the GRAM and vice-versa.

According to another variant, the power supply 58 and/or the display 53 are external to the device 5.

FIG. 6 shows a method for estimation of the quantity of light received at a point of scene 1 implemented in a device 5, according to a second non-restrictive particularly advantageous embodiment of the invention.

During an initialization step 60, the different parameters of the device 5 are updated. In particular, the parameters representative of the scene 1 are initialized in any way.

Then, during a step 61, the area light source 10 is sampled in a plurality of samples. Once sampled, the area light source 10 is assimilated to a set of point light sources, each sample corresponding to a point light source. The area light source 10 corresponds for example to a surface or volumetric light source of any form. The area light source illuminates the scene 1 and notably an occluding object 11 which occludes at least some of the light emitted by the light source 10. The occluding object is defined by a mesh comprising a plurality of first mesh elements, polygons for example, that is triangles or parallelepipeds for example. Scene 1 also comprises at least a second object, the occluding object 11 being positioned between the light source 10 and this least second object. One part of the surface 12, of this least second object is thus in the shadow of the occluding object, that is that this part in the shadow does not receive light directly emitted by the light source, the occluding object blocking all the light emitted by the light source 10 in the direction of this part in the cast shadow of the occluding object. According to a variant, the surface 12 does not comprise shadow zones, for example in the case where the area light source is close to the occluding object and larger. At least one part of the surface 12 of this at least one second object is in the penumbra, that is that this at least one part only receives some of the light emitted by the light source, the occluding object 11 blocking some of the light emitted by the area light source in the direction of this at least one part of the surface 12.

Then, during a step 62, a shadow plane is generated for each edge of the first element or elements forming the mesh of the occluding object 11 and this for each sample of the at least one part of the plurality of samples of the light source generated during step 61. These shadow planes are generated for example by extrusion of the edges from the sample of the considered light source. These shadow planes correspond to the edge silhouettes lit by the sample of the considered light source. The shadow planes are for example defined by a mesh formed by polygons, each shadow plane being for example defined by two triangles. For a first element of the mesh of the occluding object, four shadow planes are obtained for example when this first element corresponds to a triangle, three shadow planes corresponding to the silhouettes of the three triangle edges and a fourth shadow plane corresponding to the triangle itself. Generally, the number of shadow planes generated for a first mesh element comprising j (natural whole number greater than or equal to 3) edges is equal to j+1.

According to an advantageous variant, the shadow planes are generated using the inherent properties of the rendering pipeline of the graphic processors contained in a graphics card, which has the advantage of performing the necessary calculations in parallel to the generation of the shadow planes to optimize the live aspects of the generation of shadow planes and rendering of the scene. According to this variant, the first mesh element or elements are subdivided into multiple second elements, the shadow planes being thus generated by geometric deformation of these second elements. The subdivision of the first elements into second elements is advantageously carried out on-the-fly by the tessellation unit (tessellation shader) of the rendering pipeline and the geometric deformation of the second elements is advantageously carried out on-the-fly by the geometry shader of the rendering pipeline, the tessellation and the geometry shader being conceptually configured and optimized for this processing type. This variant has the advantage of being able to generate live and on-the-fly shadow planes and can thus simplify the calculations made at the CPU level to generate the shadow planes to transfer to the GPUs, thus minimizing the memory requirements to store the parameters representative of the geometry of the shadow planes when these are generated at the CPU level before being transmitted to the graphics card for the rest of the processing.

According to a variant, shadow planes are generated for each first mesh element of the occluding object or for only a part of these first mesh elements, the number of these first elements for which the shadow planes are generated being selected depending on the quality and the precision of the rendering for the desired scene. According to a variant, the shadow planes are only generated for one first mesh element, for example in the case where the occluding object is defined by a mesh comprising only one first element, for example when the occluding object is of small size.

In the same way, the shadow planes are generated, for each first mesh element, for all or part of the light source samples, depending on the quality of the desired rendering and on the calculation power available at the level of the graphics card.

Then, during a step 63, coefficients of projection representative of the opacity function, in a function base, along a ray launched from a given viewpoint in the direction of the scene are estimated. The opacity function shows the variations of the opacity level along the ray with which the function is associated. The opacity function is advantageously shown via the associated coefficients of projection, in an orthonormal function base, for example a Fourier function base. The ray for which the coefficients of projection are estimated is defined as a ray originally having a determined viewpoint of the scene and crossing a pixel of a projective texture map associated with this viewpoint. As the shadow planes are generated, intersections between the ray and each newly generated shadow plane are determined and coefficients of projection are updated using for example equation 10. The coefficients of projection are updated from a opacity value associated with the generated shadow plane, this opacity value and notably the positive or negative sign which is associated with it being determined depending on an angle formed by the ray and the normal associated with the shadow plane generated and crossed by the ray. The positive value of the opacity value is used in equation 10 when the angle formed by the ray and the normal associated with the shadow plane crossed by this same ray is greater than 90°, which means that the opacity level increases along the ray when this ray crosses the generated shadow plane, that is that the light quantity received from the light source decreases along the ray when the ray crosses the considered shadow plane. The negative value of the opacity value is used in the equation 10 when the angle formed by the ray and the normal associated with the shadow plane crossed by this same ray is less than 90°, which means that the opacity level decreases along the ray when the ray crosses the generated shadow plane, that is that the quantity of light received from the light source increases along the ray when the ray crosses the considered shadow plane.

Advantageously, the opacity value associated with each shadow plane is equal to 1 divided by the number of the area light source samples. According to a variant, the opacity value associated with each shadow plane is equal to the ratio corresponding to the total quantity of light emitted by the area light source divided by the number of samples of the area light source. According to a variant, the opacity value associated with each shadow plane is equal to a predetermined arbitrary value or to a value set by a user.

The coefficients of projection associated with a ray are advantageously stored in one or multiple projective texture maps, at the level of the pixel of the projective texture map through which the considered ray passes. A projective texture map corresponds to an RGBα map type ("Red, Green, Blue, alpha"), each RGBα channel being used to store a coefficient of projection.

The processing above described with regard to step 63 is advantageously produced for several rays having for origin the viewpoint, for example for as many rays as there are pixels in the projective texture map associated with the viewpoint. According to a variant, the number of rays for which the coefficients of projection are estimated corresponds to the number of pixels of a part of the projective texture map, that is for the pixels of the part of the projective texture map covering the zone of the scene 1 comprising shadow planes. The viewpoint with which the projective texture map is associated is advantageously selected in such a way that the projective texture map covering the zone of the scene comprising shadow planes is the smallest possible to limit the number of rays and thus limit the calculations necessary to estimate the coefficients of projection. The resolution of the projective texture map is selected in such a way to optimize the quality of the rendering of the image while limiting the calculations necessary to estimate the coefficients of projection. The resolution of the projective texture map is for example equal to 128×128 pixels, 512× 512 pixels and can go up to 4096×4096 pixels.

Finally, during a step 64, a value representative of the opacity level associated with a point of the scene belonging to a ray for which the associated coefficients of projection have been estimated, is estimated. The opacity level associated with the considered point is estimated using the opacity function associated with the considered ray, this opacity function being represented by the coefficients of projection associated with the ray comprising the point for which the value representative of the opacity level is searched. The value representative of the opacity level is for example calculated using equation 3, the variable d of equation 3 corresponding to the distance between the origin of the ray and the considered point along the ray.

Steps 62 to 64 are advantageously reiterated for each image, for example when the occluding object 11 moves in the scene or when the viewpoint according to which a user views the scene 1 changes.

Naturally, the invention is not limited to the embodiments previously described. In particular, the invention is not limited to a method for estimating a value representative of the opacity level at a point of the scene but also extends to a method for estimating the quantity of light received at a point of the scene. The invention also extends to any device implementing this method and particularly all the devices comprising at least one GPU, to the computer program products comprising program code instructions for executing the steps of the method for rendering or modelling together with any storage means (for example of the RAM or GRAM type, flash memory, CD, DVD) on which are stored the executable instructions for implementing the method for rendering or modelling. The implementation of the steps described with regard to FIGS. 2, 3 and 6 is not limited either to an implementation in shader type microprograms but also extends to an implementation in any program type, for example programs that can be executed by a CPU type microprocessor.

Advantageously, the base functions used for the estimation of the coefficients of projection are functions of an orthonormal base, for example of the Fourier type. According to a variant, the base functions used are Legendre polynomials or Tchebychev polynomials.

The use of the invention is not limited to a live use but also extends to any other use, for example for so-called post-production processing operations in a recording studio for the rendering of computer generated pictures for example. The implementation of the invention in postproduction offers the advantage of providing an excellent visual rendering in terms of realism notably while reducing the required calculation time.

The invention also relates to a method for composing a video image in two dimensions or in three dimensions, for which the quantity of light received at a point is computed and the information representative of the luminance resulting from it is used for the display of the image pixels, each pixel corresponding to a viewing direction along a viewing direction 231. The luminance value calculated for display by each of the pixels of the image is re-calculated to adapt to the different viewpoints of the spectator.

The present invention can be used in video game applications for example, whether via programs that can be executed in a PC or portable type computer or in specialized game consoles producing and displaying images live. The device 5 described with respect to FIG. 5 advantageously has interaction means, such as keyboard and/or joystick, other modes to enter commands such as for example voice recognition being also possible.

The invention claimed is:

1. A method of estimating opacity at a point of a scene, said scene being lit by an area light source, said scene comprising at least one object occluding some of the light emitted by said area light source, said occluding object being defined by a mesh, wherein the method comprises:
sampling said area light source in a plurality of samples,
for at least one sample of the plurality of samples and for at least one first mesh element of the occluding object visible from the at least one sample, generating one shadow plane per edge of the at least one first mesh element at a rendering pipeline level of graphic processors,
computing projection coefficients in a functions base from values representative of the opacity for a set of intersection points between at least one ray having for origin a viewpoint of the scene and crossing the scene and shadow planes crossed by said at least one ray, depending on an angle formed by the normal associated with each shadow plane crossed and by said at least one ray,
computing a value representative of a opacity level at a point from said at least one ray from the computed projection coefficients, wherein the opacity level increases along the at least one ray when the angle formed by said at least one ray and the normal associated with a shadow plane crossed by said at least one ray is greater than 90°, and in that the opacity level decreases along the at least one ray when the angle formed by said at least one ray and the normal associated with a shadow plane crossed by said at least one ray is less than 90°,
displaying a pixel of an image of said scene, information representative of luminance associated with said pixel being obtained from said value.

2. The method according to claim 1, wherein the projection coefficients are estimated from a weighted sum of opacity levels associated with the shadow planes crossed by said at least one ray.

3. The method according to claim 2, wherein the opacity level increases or decreases by a value corresponding to a ratio equal to the total quantity of light emitted by said area light source over the number of samples when said at least one ray has an intersection with a shadow plane.

4. The method according to claim 1, wherein generating said shadow planes comprises subdividing said at least one first mesh element into a plurality of second elements, the shadow planes being generated by geometric deformation of said second elements.

5. The method according to claim 1, wherein the functions base is a Fourier functions base.

6. The method according to claim 1, wherein said projection coefficients are stored in at least one projective texture map.

7. A device configured for the estimation of the opacity at a point of a scene, said scene being lit by an area light source, said scene comprising at least one object occluding some of the light emitted by said source, said object being defined by a mesh, wherein the device comprises at least a one graphics processor configured for:
sampling said area light source in a plurality of samples,
generating, for at least one sample of the plurality of samples and for at least one first mesh element of the occluding object visible from the at least one sample, a shadow plane per edge of the at least one first mesh element at a rendering pipeline level of said at least one graphics processor,
computing projection coefficients in a function base from values representative of the opacity for a set of intersection points between at least one ray having for origin a viewpoint of the scene and crossing the scene and the shadow planes crossed by said at least one ray, depending on an angle formed by the normal associated with each crossed shadow plane and by said at least one ray,
computing a value representative of a opacity level at a point of said at least one ray from the estimated projection coefficients, wherein the opacity level increases along the at least one ray when the angle formed by said at least one ray and the normal associated with a shadow plane crossed by said at least one ray is greater than 90°, and in that the opacity level decreases along the at least one ray when the angle formed by said at least one ray and the normal associated with a shadow plane crossed by said at least one ray is less than 90°,
the device further comprising a display screen for displaying a pixel of an image of said scene, information representative of luminance associated with said pixel being obtained from said value.

8. The device according to claim 7, wherein the projection coefficients are computed from a weighted sum of opacity levels associated with the shadow planes crossed by said at least one ray.

9. The device according to claim 7, wherein the opacity level increases or decreases by a value corresponding to a ratio equal to the total quantity of light emitted by the area light source over the number of samples when said at least one ray has an intersection with a shadow plane.

10. The device according to claim 7, wherein the at least a processor is further configured for subdividing said at least one first mesh element into a plurality of second elements, the shadow planes being generated by geometric deformation of said second elements.

11. The device according to claim 7, wherein the functions base is a Fourier functions base.

12. The device according to claim 7 further comprising a memory comprising at least one projective texture map for storing said projection coefficients are stored.

13. A non-transitory computer-readable medium comprising a computer program product recorded thereon and capable of being run by a processor, including program code instructions for implementing the method according to claim 1.

* * * * *